(12) United States Patent
Jacoby et al.

(10) Patent No.: US 8,385,588 B2
(45) Date of Patent: Feb. 26, 2013

(54) RECORDING AUDIO METADATA FOR STORED IMAGES

(75) Inventors: Keith A. Jacoby, Rochester, NY (US); Thomas J. Murray, Cohocton, NY (US); John V. Nelson, Rochester, NY (US); Kevin M. Gobeyn, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1142 days.

(21) Appl. No.: 11/954,089

(22) Filed: Dec. 11, 2007

(65) Prior Publication Data

US 2009/0150147 A1 Jun. 11, 2009

(51) Int. Cl.
*G06F 15/00* (2006.01)
*G10L 11/00* (2006.01)
(52) U.S. Cl. ........................................ 382/100; 704/200
(58) Field of Classification Search .................. 382/100; 704/200
See application file for complete search history.

(56) References Cited

U.S. PATENT DOCUMENTS

| | | | | |
|---|---|---|---|---|
| 4,156,868 A * | 5/1979 | Levinson | ...................... | 704/251 |
| 4,983,996 A * | 1/1991 | Kinoshita | ...................... | 396/312 |
| 5,819,265 A * | 10/1998 | Ravin et al. | ........................... | 1/1 |
| 5,995,936 A * | 11/1999 | Brais et al. | ..................... | 704/275 |
| 6,496,656 B1 | 12/2002 | Nelson et al. | | |
| 6,518,952 B1 | 2/2003 | Leiper | | |
| 6,606,117 B1 | 8/2003 | Windle | | |
| 6,665,639 B2 | 12/2003 | Mozer et al. | | |
| 6,721,001 B1 * | 4/2004 | Berstis | ........................ | 348/231.3 |
| 6,833,865 B1 | 12/2004 | Fuller et al. | | |
| 6,993,196 B2 | 1/2006 | Sun et al. | | |
| 7,035,467 B2 * | 4/2006 | Nicponski | ..................... | 382/224 |
| 7,202,838 B2 | 4/2007 | Kerr et al. | | |
| 7,225,131 B1 | 5/2007 | Bangalore et al. | | |
| 7,515,770 B2 * | 4/2009 | Fukada | ......................... | 382/284 |
| 7,686,682 B2 * | 3/2010 | Diakopoulos et al. | .......... | 463/11 |
| 7,881,864 B2 * | 2/2011 | Smith | ......................... | 701/439 |
| 2003/0128877 A1 * | 7/2003 | Nicponski | ..................... | 382/224 |
| 2003/0156304 A1 | 8/2003 | Fedorovskaya et al. | | |
| 2004/0174434 A1 | 9/2004 | Walker et al. | | |
| 2005/0169499 A1 * | 8/2005 | Rodriguez et al. | ............ | 382/100 |
| 2005/0281541 A1 * | 12/2005 | Logan et al. | .................... | 386/96 |
| 2006/0077461 A1 * | 4/2006 | Camara et al. | .............. | 358/1.15 |
| 2006/0170669 A1 | 8/2006 | Walker et al. | | |
| 2007/0150916 A1 | 6/2007 | Begole et al. | | |
| 2007/0174326 A1 | 7/2007 | Schwartz et al. | | |
| 2008/0269926 A1 * | 10/2008 | Xiang et al. | .................... | 700/94 |

OTHER PUBLICATIONS

Lucas C. Parra: "An Introduction to Independent Component Analysis and Blind Source Separation" Apr. 25, 1999, Internet Citation, [Online], XP-002302156, Retrieved from the Internet: URL:http://newton.bme.columbia.edu/lparra/publish/princeton98.pdf>, [retrieved on Oct. 10, 2004].

* cited by examiner

*Primary Examiner* — Eric Yen
(74) *Attorney, Agent, or Firm* — Raymond L. Owens (57) ABSTRACT

A method of processing audio signals recorded during display of image data from a media file on a display device to produce semantic understanding data and associating such data with the original media file, includes: separating a desired audio signal from the aggregate mixture of audio signals; analyzing the separated signal for purposes of gaining semantic understanding; and associating the semantic information obtained from the audio signals recorded during image display with the original media file.

15 Claims, 7 Drawing Sheets

RECORDING AUDIO METADATA FOR STORED IMAGES

FIELD OF THE INVENTION

The invention relates generally to the field of audio processing, and in particular to embedding audio metadata in a media file of associated still or video digitized imagery.

BACKGROUND OF THE INVENTION

The digital multimedia revolution has spawned a vast array of products and devices upon which media can be viewed, such as personal digital assistants (PDAs), digital picture frames, cellular phones, liquid crystal displays (LCD), cathode-ray tube (CRT), projection devices, plasma screens, and the capture devices themselves. The multimedia/imaging industry will continue to embrace ways other than hardcopy prints to view and share imagery. This fact, combined with the proliferation of digital media stored in memory devices and repositories as diverse as the displays themselves, presents a significant challenge in terms of organization, search and retrieval of images of interest.

As the number of these digital images continues to grow, there is much effort in industry and academia spent on technologies that analyze image data to understand the content, context, and meaning of the media without human intervention. This area of technologies is called semantic understanding, and algorithms are becoming more and more sophisticated in how they analyze audiovisual data and non-audiovisual data, called metadata, within a media file. For example, face detection/recognition software can identify faces present in a scene. Speech recognition software can transcribe what is said in a video or audio file, sometimes with excellent accuracy depending on the quality of the sound and attributes of the speech. Speaker recognition software is capable of measuring the characteristics of an individual's voice and applying heuristic algorithms to guess the speaker's identity from a database of characterized speakers. Natural language processing methods bring artificial intelligence to bear as an automated way for understanding speech and text without human intervention. These methods produce very useful additional metadata that often is re-associated with the media file and used for organization, search and retrieval of large media collections.

There have been many innovations in the consumer electronics industry that marry media files such as digital still photographs with sound. For example, U.S. Pat. No. 6,496,656 teaches how to embed an audio waveform in a hardcopy print. U.S. Pat. No. 6,993,196 teaches how to store audio data as non-standard metadata at the end of a digital image file.

U.S. Pat. No. 6,833,865 teaches about an automated system for real time embedded metadata extraction that can be scene or audio related so long as the audio already exists in the audio-visual data stream. The process can be done parallel to image capture or subsequently. U.S. Pat. No. 6,665,639 teaches a speech recognition method and apparatus that can recognize utterances of specific words, independent of who is speaking, in audio signals according to a pre-determined list of words.

That said, there often is no substitute for human intuition and reason, and a real person viewing media will almost always understand and recognize things that computers have a hard time with. There are those who maintain that computers will one day equal or surpass the processing and reasoning power of the human brain, but this level of artificial intelligence technology lies far into the future. As an example, consider a system that analyzes an image with several people in a scene. The system may use face detection algorithms to locate faces, and recognition algorithms to identify the people. Extending this example into the video space, additional algorithms to detect and identify speech can be employed to produce a transcript, or to augment metadata through recognition of specific words in a list. While the existing technology is promising, it is arguable that such algorithms will compare unfavorably with a human performing these tasks for the foreseeable future.

Suppose two people are viewing images as a slideshow on a digital picture frame or other display device. The people can, and often do, comment on who is in the image, the circumstances in which the image was captured. Typically this commentary is ephemeral and has no lasting value beyond the viewing moment. By the time the next image is displayed, the commentary has withered from the minds of the viewers.

There has been much activity related to annotating image data with descriptive text. Some use variations on a simple text entry interface, where the viewer enters textual information through a keyboard input device, the text subsequently associated with the image data. For example, Google has a web application called Google Image Labeler, developed by Carnegie Mellon University. It is a collaborative real-time application that turns the task of image keyword tagging into a game. The system takes a "distributed human processing" approach, where individuals spend their own time viewing and tagging randomly chosen images. The words are then saved as keywords in the image file, to aid in future search queries.

Other methods for annotating images with additional metadata take advantage of audio, specifically speech. U.S. Pat. No. 7,202,838, teaches a graphical user interface which allows a picture database user to annotate digital pictures to promote efficient picture database browsing, where annotation can take the form of comments spoken by the user. U.S. Pat. No. 7,202,838 describes a system for showing medical imagery on a display, through which additional data can be gathered in several forms, including written annotation and speech, and associated with the imagery for diagnostic and other purposes. In another medically related patent, U.S. Pat. No. 6,518,952 describes a system and device for displaying medical images and controlling a way of recording, synchronizing, and playing back dictation associated with the imagery.

Similarly, in U.S. Pat. No. 7,225,131 describes a system and method of capturing user input comprising speech, pen, and gesture, or any combination thereof describing a medical condition, and associating the user input with a bodily location via a multi-modal display that shows a schematic representation of the human body.

SUMMARY OF THE INVENTION

The present invention permits the automatic capture of viewer commentary on media shown on a display, and subsequent association of the viewer commentary with the displayed media on the various display devices mentioned above.

Briefly summarized, in accordance with the present invention, there is provided a method of processing audio signals recorded during display of image data from a media file on a display device to produce semantic understanding information and associating such data with the original media file, comprising: separating a desired audio signal from the aggregate mixture of audio signals;

analyzing the separated signal for purposes of gaining semantic understanding information; and associating the semantic understanding information obtained from the audio signals recorded during image display with the original media file.

An advantage of the present invention stems from the fact that a media file's metadata can be appended with additional information or metadata by a combination of automatic algorithms and user-interactive processes for an improved semantic understanding of the captured image(s), for aid in search and retrieval algorithms, and for an enhanced user viewing experience.

The present invention has the following additional advantages: Automatic capture and association of audio and audio-related metadata concurrent with multimedia image data display. From the initial moment of display until the next scene, buffered audio samples are automatically stored as metadata in memory for analysis. The semantic analysis of the audio can occur during image display/audio capture in real time, or can occur some time after image display/audio capture.

A further advantage of the present invention results from the fact that audio signals captured during image display provides context of the scene and useful metadata that can be analyzed for a semantic understanding of the displayed image. A process, in accordance with the present invention, associates a window of audio signal information for the duration an image is displayed, allowing the viewer the freedom of not having to actively initiate the audio capture through actuation of a button or switch. The only physical actions required by the viewer are to provide commentary germane to the imagery currently displayed, and to progress to the next image or video in the case where the user is not viewing an automated slideshow. The management of the audio capture, and of association of the audio signal and extracted metadata with the image(s) is automatically handled by the device's electronics and is completely transparent to the viewer.

The display device has the option of displaying digitized imagery in various ways. For example, a collection of still images can be displayed sequentially or randomly for a fixed period of time, or they can be displayed according to a predetermined script as in a slideshow with accompanying music or narration. Another viewing modality is for the viewer to view the pictures in an ad-hoc fashion, browsing through the collection of images within the storage hierarchy in the display device's internal memory, removable memory or as stored on a remote computer.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in its preferred embodiment as a digital picture frame device. Those skilled in the art will readily recognize that the equivalent invention can also exist in other embodiments.

It is understood that the phrases "image", "captured image", "image data", "imagery", "scene", and the like as used in this description of the present invention relate to still images as well as moving images, as in a video. The terms "media" and "multimedia" are used interchangeably, and refer to audiovisual data as well as separate audio data, image data and video data as stored in a digitized computer file. When called for, the terms "still image" and "video", or variations thereof, will be used to describe still or motion imagery display scenarios that are distinct.

Figure 1:
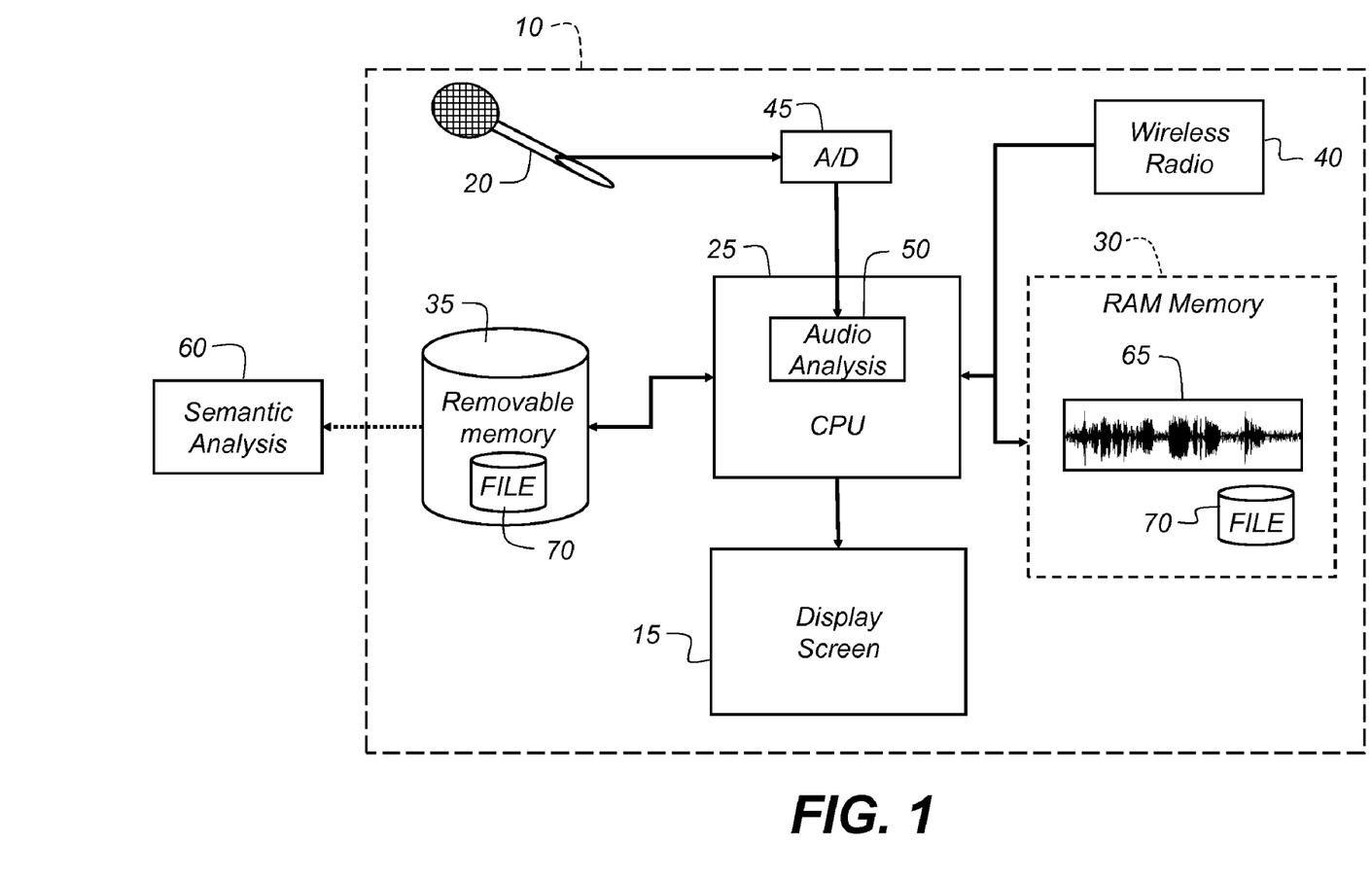
FIG. 1 is block diagram that depicts an embodiment of the invention.

Referring to FIG. 1, a display device 10 capable of displaying still or video imagery is shown. The display device 10 includes a display screen 15 and at least one built-in microphone 20. Upon activation of the display device 10, the viewer 80 (see FIG. 3) has the option of viewing imagery as a slideshow, or through ad-hoc browsing of a media file 70 stored in internal memory 30 or a removable memory 35 device. The display device 10 can also include a wireless radio 40 and therefore communicate via wireless signals 95 (see FIG. 3) with a remote computer 90 (see FIG. 3) over wireless network protocols such as Bluetooth, 802.11 "Wi-Fi" or "Wi-Max". The display device 10 additionally contains an audio analog to digital converter 45 for digitization of the microphone's 20 output into a recorded audio signal 65. A computer CPU 25 within the display device 10 controls all encoding and decoding functions, graphical user interface functions, media file 70 input and output, signal processing 135 (see FIG. 5) and any audio analysis 50 tasks, and other typical functionality commensurate with the display device 10.

Figure 2:
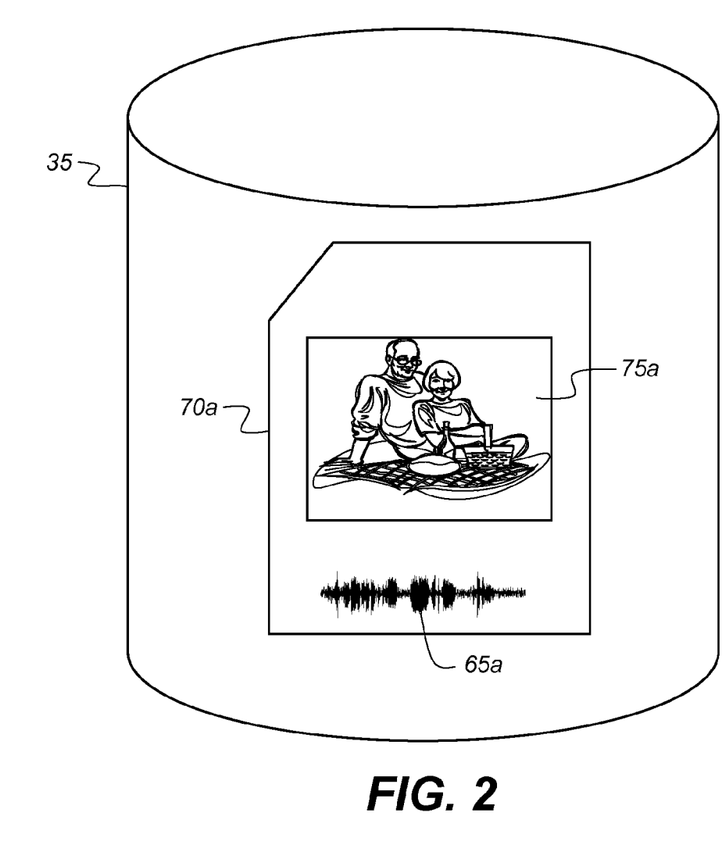
FIG. 2 shows a media file containing image and audio data.

The display device 10 has the ability to show image data 75 (see FIG. 3) from multiple sources. In the preferred embodiment, the display device 10 contains at least one of a number of possible ways for storing media files 70. FIG. 2 shows a removable memory 35 such as a Secure Digital (SD) card or Compact Flash Memory card containing at least one media file. Each media file 70a can contain image data 75a, as well as a recorded audio signal 65a such as voice annotation, an audio clip, or an audio stream or layer such as those typically associated with video.

Figure 3:
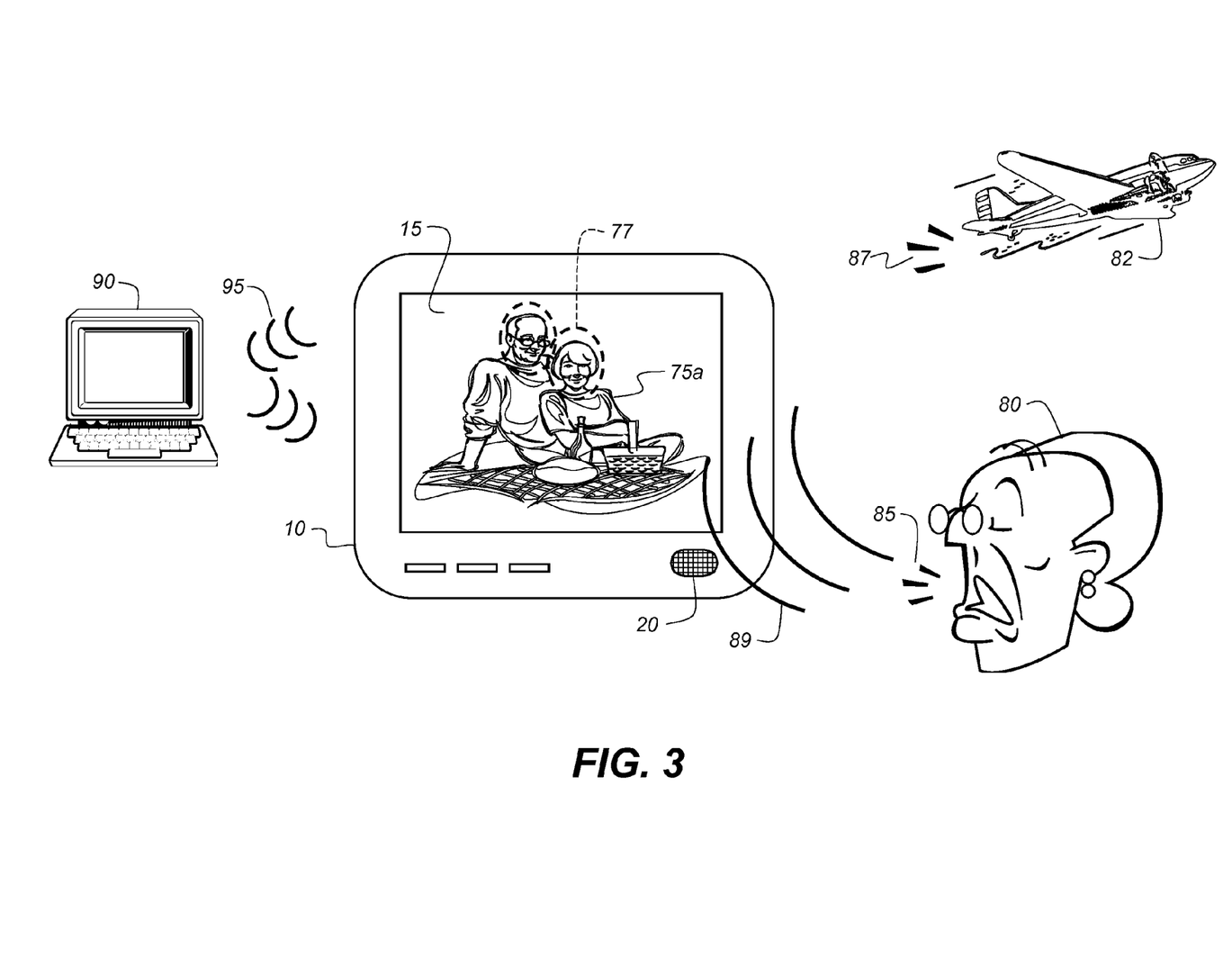
FIG. 3 is a cartoon depicting a typical usage scenario, containing a viewer, a remotely located computer and a display device.

Referring to FIG. 3, the preferred embodiment of the display device 10 shows image data 75a on its display screen 15 to a viewer 80. The viewer commentary 85 from the viewer 80 is sensed by the microphone 20 and digitized by the audio analog to digital converter 45 (see FIG. 1) within the display device 10. This viewer commentary 85 often contains information that is germane to the image data 75a contained in the media file 70a (see FIG. 2) currently shown on the display device 10. For example, the viewer 80 can make mention of recognized individuals 77 or objects in the image data 75a, or comment on location using place names, or describe actions taking place in the scene. This viewer commentary 85 recorded by the microphone 20 during the viewing of image data 75a on the display device 10 is useful with regard to semantic understanding of the associated media file 70a, and can be considered newly acquired audio metadata in the form of a recorded audio signal 65a (see FIGS. 2 and 4).

Figure 4:
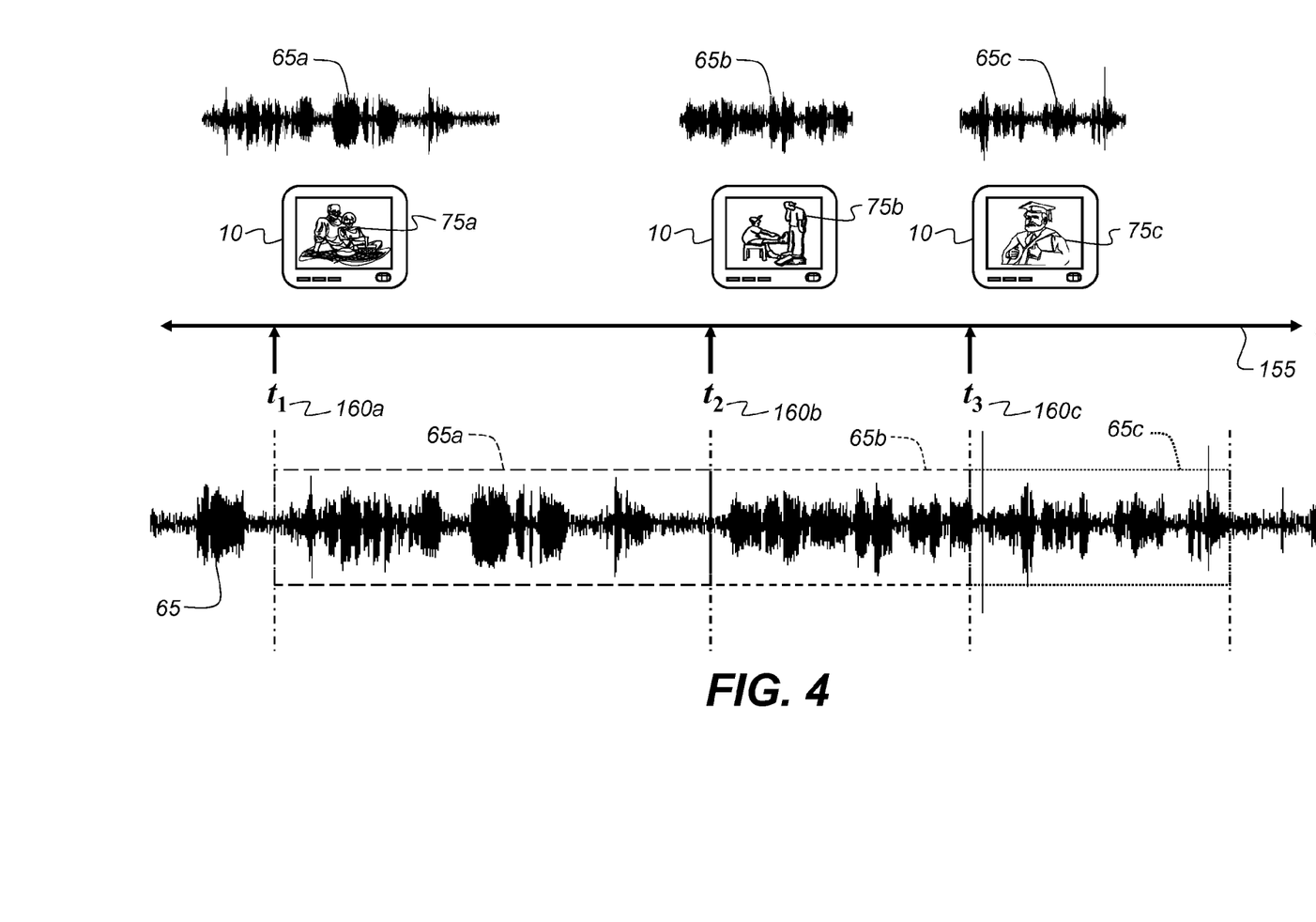
FIG. 4 is a detailed diagram showing digitized audio signal waveforms as time-variant signals that overlap an image display scenario.

FIG. 4 is a detailed diagram illustrating a timeline 155 and associated temporally progressing depictions of the display device 10, image data 75a, 75b, 75c, and recorded audio signals 65a, 65b, 65c. Referring to FIG. 4, the display device 10 loads media file 70a (see FIG. 2) from one of several possible sources. As described earlier, this source can be the display device's 10 internal memory 30 (see FIG. 1), a removable memory 35 device (see FIG. 1, 2), or a media file 70 located on a remote computer 90 (see FIG. 3). At the $t_1$ time marker 160a, the displayed image data 75a is shown on the display device 10. Concurrently, the microphone 20 (see FIG. 3) records viewer commentary 85 (see FIG. 3) and a digitized audio signal 65 is buffered in the internal memory 30. At the $t_2$ time marker 160b, the display device 10 ceases showing the displayed image data 75a. A segment of the recorded audio signal 65 between the t1 time marker 160a and t2 time marker 160b is designated as recorded audio signal 65a associated with the displayed image data 75a. As the display device 10 begins showing displayed image data B 75b at the $t_2$ time marker 160b, the display device 10 continues to record the viewer commentary 85 that is buffered in internal memory 30 as a recorded audio signal 65. At the $t_3$ time marker 160c, the display device 10 ceases showing displayed image data B 75b. A segment of the recorded audio signal 65 between the t2 time marker 160b and t3 time marker 160c is designated as audio signal B 65b associated with displayed image data B 75b. The process of recording audio and associating the sequentially recorded audio signals 65a, 65b, 65c with sequentially displayed image data 75a, 75b, 75c continues until the viewer 80 decides to stop or the display device 10 runs out of media files 70 to show the viewer 80.

Figure 5:
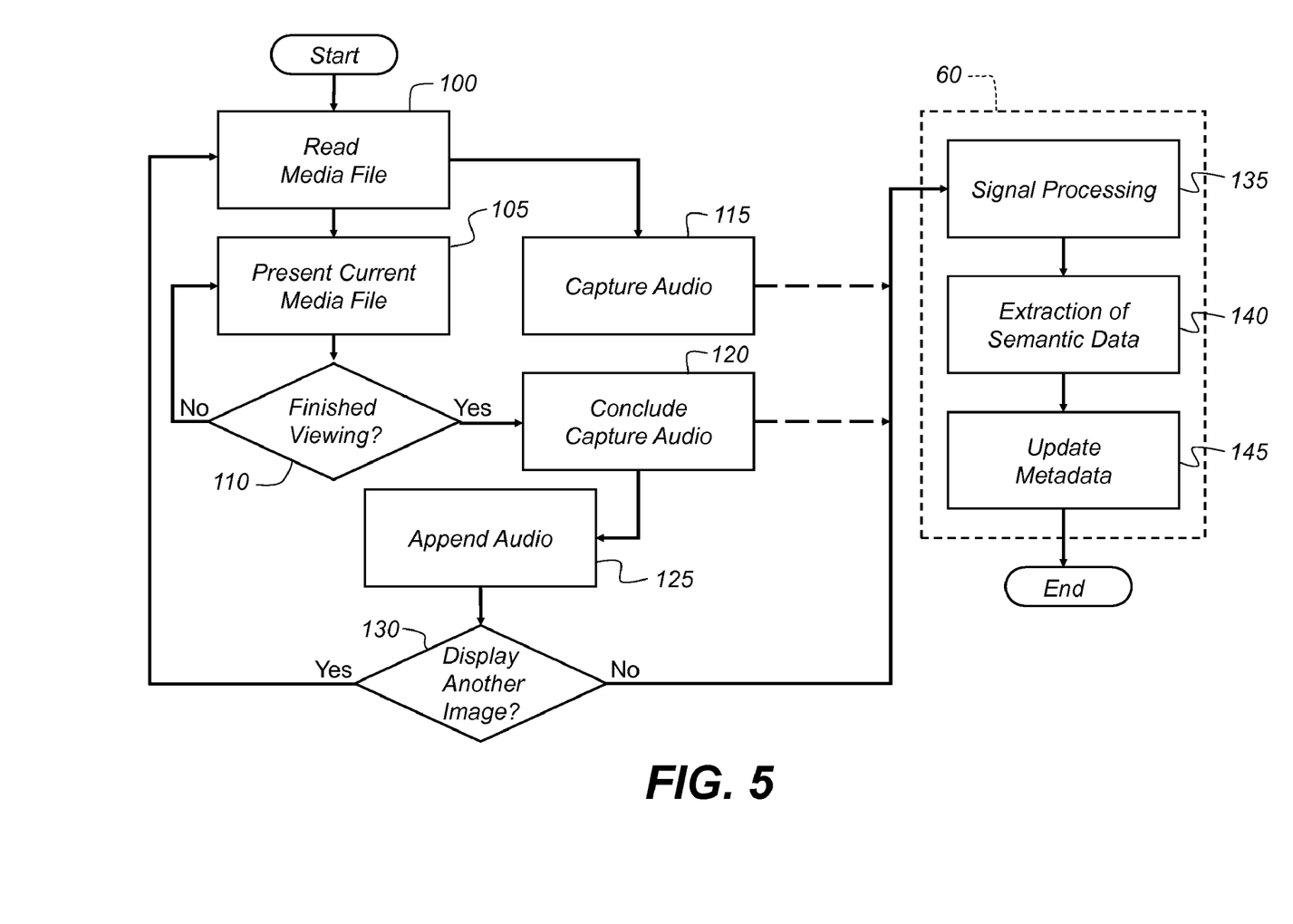
FIG. 5 is a flow diagram illustrating the high-level events that take place in a typical use case, using the preferred embodiment of the invention.

FIG. 5 is a flow diagram illustrating the high-level events that take place in a typical usage scenario of the preferred embodiment of the invention. It is helpful to consider this usage scenario by describing the steps in FIG. 5 and using FIG. 4 to provide temporal context of the usage scenario. Referring to FIG. 5, the process starts with a user 80 (see FIG. 3) initiating a viewing session on the display device 10 (see FIGS. 1, 3, 4). The display device 10 reads a first media file 70a (see FIG. 4) in a Read Media File step 100. The media file 70a is then shown on the display device's 10 display screen 15 (see FIG. 1) in a present current media file step 105. During the present current media file step 105, a parallel capture of audio step 115 captures the viewer commentary 85 (see FIG. 3) as a digitized audio signal 65 (see FIG. 4) as the viewer 80 comments on the image data 75a (see FIG. 4) currently shown on the display device 10. The display device 10 continues to present current media file 105 and capture of audio 115 until such time as the viewer 80 is finished viewing 110 the present current media file step 105. The viewer 80 decides whether he/she is finished viewing 110 the image data 75 either by the viewer 80 manually progressing to the next media file B 70b or the display device 10 automatically advancing to the next media file B 70b, as would be the case if the viewer 80 were viewing an automated slideshow. When the viewer 80 is either voluntarily or involuntarily finished viewing 110 the displayed image data 75a, the display device 10 concludes capture of audio 120 of the viewer commentary 85. With the conclusion of the capture of audio 120 for displayed image data 75a (see FIG. 4), audio signal 65a is written to media file 70a in an append audio step 125. Should the viewer 80 wish to display another image 130, or if there remains additional media files 70 constituting a pre-arranged or automated slideshow, the process returns to the read media file step 100, and the viewing of media files 70 continues until there is a negative result to the display another image 130 decision.

The beginning and ending of viewer commentary 85 for a specific media file 70a made during a viewing of multiple media files 70a, 70b, 70c can also be determined by analysis of the recorded audio signal 65. Such analyses can include detection of pauses or specific transitory words (words signaling that the viewer 80 is progressing to the next media file 70) in the recorded audio signal 65, and can indicate the beginning and ending of recorded audio signal 65a to be associated with media file 70a. The pauses or transitory words can also provide control of media file 70 transitions, anticipating when the viewer 80 is finished providing viewer commentary 85 for media file 70a and ready to move on to media file B 70b.

When viewing of all the media files 70a, 70b, 70c is complete, there exists recorded audio signals 65a, 65b, 65c associated with the displayed image data 75a, 75b, 75c (see FIG. 4). In the preferred embodiment, the display device's 10 computer CPU 25 (see FIG. 1) begins a semantic analysis process 60 (see FIG. 5) that analyzes the audio signals 65a, 65b, 65c. The semantic analysis process 60 can include a signal processing step 135 to prepare the recorded audio signals 65a, 65b, 65c prior to the extraction of semantic data 140. Referring to FIG. 5, the signal processing 135 and extraction of semantic data steps 140, depending on their complexity and the computational power of the computer CPU 25 on which they are performed, can be done in real time; i.e. in parallel to the capture of audio step 115, or in the background while the display device 10 is otherwise idle. A networked remote computer 90 (see FIG. 3) can also perform signal processing 135 and extraction of semantic data steps 140 steps by virtue of the semantic analysis 60 process's ability to reside external to the display device 10. In the preferred embodiment of the invention, the display device's 10 computer CPU 25 performs the signal processing 135, extraction of semantic data 140, and update metadata operation 145, shown in detail in FIG. 6.

Figure 6:
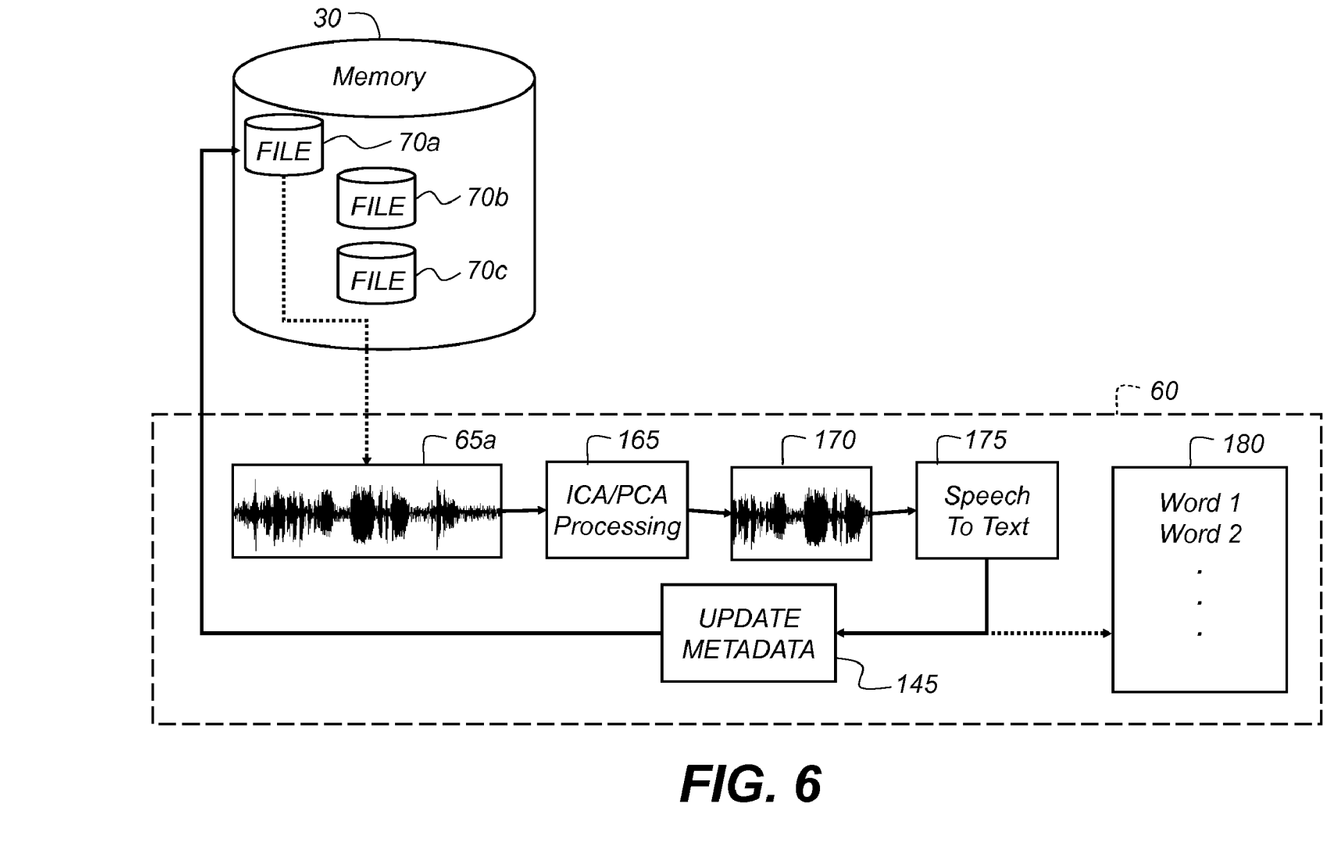
FIG. 6 is a block diagram of a Semantic Analysis Process for analyzing the recorded audio signals.

The recorded audio signals 65a, 65b, 65c (see FIG. 4) previously associated with the displayed image data 75a, 75b, 75c, (see FIG. 4) can be exploited in a number of ways through signal processing 135 and extraction of semantic data steps 140 (see FIG. 5). Referring to FIG. 6, and continuing with the description of the preferred embodiment of the invention, media file 70a stored in the internal memory 30 now has a recorded audio signal 65a containing viewer commentary 85 (see FIG. 3) spoken by the viewer 80 during viewing of the displayed image data 75a (see FIG. 4). The media file's 70a accompanying recorded audio signal 65a is simply a segment of the recorded audio signal 65 (see FIG. 4) recorded during viewing of the media files 70a, 70b, 70c, however additional operations can be necessary in order to provide useful semantic understanding metadata. The semantic analysis process 60 can use methods such as Independent Component Analysis (ICA) or Principle Component Analysis (PCA) processing 165 to the audio signals 65a, 65b, 65c to enhance or separate the viewer commentary 85 signal component contained therein. Briefly, ICA and PCA 165 are signal processing techniques for extracting source signals from an aggregate mixture of sound 89 (see FIG. 3), which is defined as the summation of sounds from all sound producing sources within the range of the display device's 10 microphone 20; in this case the aggregate mixture of sound 89 is the combination of the viewer commentary 85 from the viewer 80 and the ambient audio 87 emitted by an ambient source 82 (shown in FIG. 3 as an airplane), summed to produce the recorded audio signal 65. For a recorded audio signal 65, those skilled in the art recognize that ICA and PCA allow for extraction of a source signal—in this case a speech component signal such as the viewer commentary 85 discussed above, from the aggregate mixture of sound 89. The result of ICA/PCA processing 165 is an enhanced speech signal component 170 that is substantially more intelligible. The preferred embodiment of the invention uses ICA/PCA processing methods 165 applicable to a single-mixture signal, which is a mixture of two or more signals obtained using a single microphone 20. Those skilled in the art will recognize that more effective ICA methods can be applied to multiple signal mixtures, or mixtures of signals obtained from multiple microphones 20.

The enhanced speech signal component 170 is subsequently input to a speech to text operation 175, whose output constitutes a textual metadata 180. The textual metadata 180 can be keywords recognized from a pre-determined vocabulary, or a transcription of the speech utterances 85 (see FIG. 3) captured during viewing of the image data 75. The textual metadata 180 constitutes additional metadata, which is re-associated with the media file 70a in an update metadata operation 145. The semantic analysis process 60 continues for subsequent media files B and C 70b, c and their respective recorded audio signals B and C 65b, c.

Other types of semantic analyses can be combined with the analysis of the recorded audio signals 65a, 65b, 65c. For example, in addition to a speech to text operation 175, a face detection/recognition engine applied to the image data 75 (see FIG. 3) can identify one or more faces 77 in the image data 75, and prompt the viewer 80 to state the name(s) of the recognized persons' faces 77 in the displayed image data 75a, b, c and subsequently associate the stated names' textual metadata 180 with the identified faces 77. Additionally, a scene analysis algorithm can determine places, objects, and activities in the image data 75, prompt the viewer 80 to state the names of recognized places, objects and activities recognized in the displayed image data 75a, 75b, 75c and subsequently associate the scene-related textual metadata 180 with the identified places, objects and activities. Natural Language Processing (NLP) algorithms can achieve the above-described associations in the case where the textual metadata 180 is a transcription of the viewer commentary 85. People's names, place names, object names, and the like are recognized as the NLP algorithm parses the textual metadata 180. The recognized names, terms, and phrases can then be added to the metadata of the media file 70, as shown by the update metadata operation 145 (see FIGS. 5, 6).

Textual metadata 180 obtained from one media file 70a (see FIG. 6) can be associated with the other media files 70b, 70c in cases where media files 70a, 70b, 70c share common metadata, as would be the case if multiple media files 70a, 70b, 70c were captured during a specific event at a specific location. The media files' 70a, 70b, 70c common metadata will include similar or identical date and location or Global Positioning System (GPS) information.

Image data 75 (see FIG. 3) that attract more viewer commentary 85 are generally more valuable than images with less viewer commentary 85. A commentary value metric that reflects the amount of viewer commentary 85 can serve as metadata that informs automated or manual methods for composing stories, presentations, or other products that combine images. For example, a slideshow presentation can be put together based on which media files 70 contain substantial viewer commentary 85 or a substantial amount of associated textual metadata 180.

The update metadata operation 145 (see FIG. 6) can store the additional textual metadata 180 by appending the original media files 70a, 70b, 70c in proprietary or standard metadata tags. Alternatively, the update metadata operation 145 can store the additional textual metadata 180 in a database located in internal memory 30, removable memory 35, or an a remote computer 90 (see FIG. 3) where it is associated with, but not necessarily included in, the original media files 70a, 70b, 70c.

Figure 7:
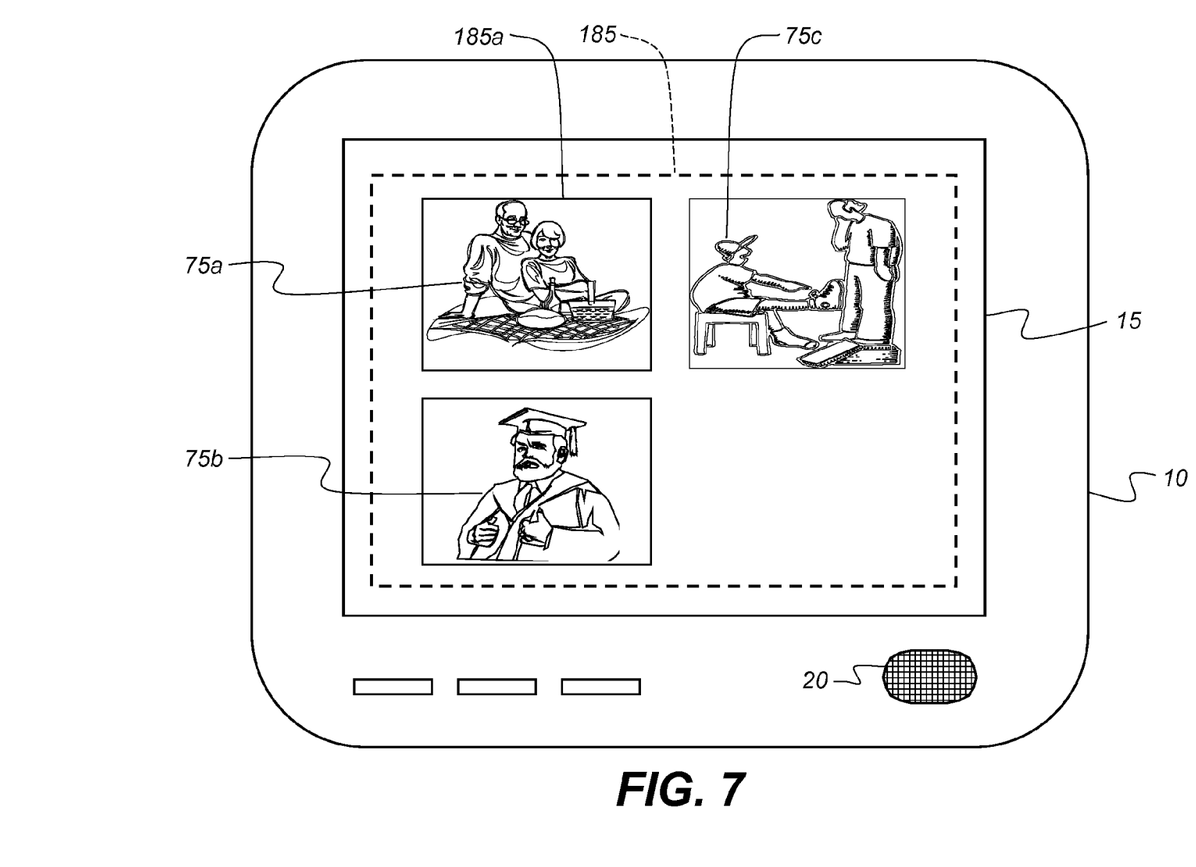
FIG. 7 shows a view of the display device showing a group of associated image data thumbnail views.

Many display devices 10 (see FIG. 1) have user interfaces that allow for browsing of media files 70a, 70b, 70c (see FIG. 4) located in internal memory 30, removable memory 35, or on a remote computer 90 (see FIG. 3). Referring to FIG. 7, often it is the case that collections of associated media files 70a, 70b, 70c (see FIG. 4) are shown graphically on the display device's 10 display screen 15 as a single static or animated thumbnail icon 185a or group of thumbnail icons 185 representing one or more associated media files 70a, 70b, 70c; for example, in FIG. 7 a group of thumbnail icons 185 arranged in a grid on the display screen 15 can indicate that the media files 70a, 70b, 70c have some common attributes reflected in their metadata or their audiovisual content. When the viewer 80 (see FIG. 3) views this, or a subset of, this group of thumbnail icons 185 or other group representation of media files 70a, 70b, 70c any viewer commentary 85 captured while the viewer 80 is viewing the group of thumbnail icons 185 is automatically associated with all media files 70a, 70b, 70c.

PARTS LIST

10 Display Device
15 Display Screen
20 Microphone
25 Computer CPU
30 Internal Memory
35 Removable Memory
40 Wireless Radio
45 Audio Analog to Digital Converter
50 Audio Analysis Operation
60 Semantic Analysis Process
65 Recorded Audio Signal
65a Recorded Audio Signal
65b Recorded Audio Signal
65c Recorded Audio Signal
70 Media File
70a Media File
70b Media File
70c Media File
75a Image Data
75b Image Data
75c Image Data
77 Recognized Individuals/Objects
80 Viewer
82 Ambient Audio Source
85 Viewer Commentary
87 Ambient Audio
89 Aggregate Mixture of Sound
90 Remote Computer
95 Wireless Signals
100 Read Media File Step
105 Present Current Media File Step
110 Finished Viewing Step
115 Capture of Audio Step
120 Conclude Capture of Audio Step
125 Append Audio Step
130 Display Another Image Step
135 Signal Processing Step
140 Extraction of Semantic Data Step
145 Update Metadata Operation Step 155 Timeline
160a t₁ Time Marker
160b t₂ Time Marker
160c t₃ Time Marker
165 Independent/Principle Component Analysis (ICA/PCA)
170 Enhanced Speech Signal Component
175 Speech to Text Operation
180 Textual Metadata
185 Group of Thumbnail Icons
185a Thumbnail Icon

The invention claimed is:

1. A method of processing audio signals including speech signals, the audio signals and image data being recorded in a media file, comprising:
  a. automatically extracting the speech signals from the audio signals from the media file and converting the speech signals to textual metadata wherein the textual metadata are keywords recognized from a pre-determined vocabulary;
  b. automatically analyzing the textual metadata using natural language processing algorithms to identify people's names, place names, or object names and adding the identified names to the textual metadata;
  c. using the updated textual metadata to compute a commentary value metric wherein the commentary value metric is a measure of the amount of viewer commentary associated with the media file;
  d. automatically semantically analyzing the image data from the media file to identify a person, place, object or activity to produce a visual display of selected portions of the image data, and prompt the user to provide additional textual metadata associated with each of the selected portions of the image data; and
  e. associating the updated textual metadata automatically obtained from the speech signals in the media file, the additional textual metadata provided by the user during the display of the selected portions of the image data from the media file, and the commentary value metric with the media file.

2. The method of claim 1, further including providing at least one microphone in the display device and digitizing audio signals captured by the microphone(s).

3. The method of claim 1, wherein a still or video digitized image is stored in, and read from, a display device's internal memory or from a removable storage device.

4. The method of claim 1, wherein the still or video digitized image is stored on, and read from, a remotely located computer on a wired or wireless network.

5. The method of claim 1, further comprising separating the audio signal into components and selecting one of the components for analysis.

6. A method of applying the method of claim 1 to a plurality of different media files to obtain common metadata and associating such obtained metadata with the related media files.

7. The method of claim 6, wherein the related media files share a common location of capture.

8. The method of claim 6, wherein the related media files share one or more common person(s), places, activities or object(s).

9. The method of claim 6, wherein the related media files share content-descriptive metadata.

10. The method of claim 6, wherein the related media files share common event metadata.

11. The method of claim 1, further including providing a value metric to measure the amount of viewer commentary associated with the media files.

12. The method of claim 2, further including analysis of the audio signal to determine the beginning and ending of viewer commentary associated with image data.

13. The method of claim 12, further including providing control of image transitions during display according to the analysis of the audio signal.

14. The method of claim 6, wherein the plurality of media files is displayed as a group of related images or thumbnail icons.

15. The method of claim 6, wherein the plurality of media files is displayed as a single image or thumbnail icon representing a group or collection of related images.

* * * * *

UNITED STATES PATENT AND TRADEMARK OFFICE
CERTIFICATE OF CORRECTION

| | | |
|---|---|---|
| PATENT NO. | : 8,385,588 B2 | Page 1 of 1 |
| APPLICATION NO. | : 11/954089 | |
| DATED | : February 26, 2013 | |
| INVENTOR(S) | : Jacoby et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this
Eleventh Day of November, 2014

Michelle K. Lee
*Deputy Director of the United States Patent and Trademark Office*